United States Patent
Bajpai et al.

(10) Patent No.: US 11,983,155 B2
(45) Date of Patent: May 14, 2024

(54) NAMESPACE RANGE CREATION TO DISTRIBUTE WORKLOAD IN A DISPERSED STORAGE SYSTEM

(71) Applicant: INTERNATIONAL BUSINESS MACHINES CORPORATION, Armonk, NY (US)

(72) Inventors: Vivek Bajpai, Dekalb, IL (US); Thomas Dubucq, Chicago, IL (US); Kevin Michael Freese, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 480 days.

(21) Appl. No.: 16/742,180

(22) Filed: Jan. 14, 2020

(65) Prior Publication Data
US 2021/0216513 A1 Jul. 15, 2021

(51) Int. Cl.
*G06F 16/22* (2019.01)
*G06F 3/06* (2006.01)

(52) U.S. Cl.
CPC ............ *G06F 16/22* (2019.01); *G06F 3/0604* (2013.01); *G06F 3/0655* (2013.01); *G06F 3/067* (2013.01)

(58) Field of Classification Search
CPC ...... G06F 16/22; G06F 3/0604; G06F 3/0655; G06F 3/067
USPC ........................................................ 707/830
See application file for complete search history.

(56) References Cited

U.S. PATENT DOCUMENTS

| | | | |
|---|---|---|---|
| 9,280,318 B2 | 3/2016 | Du et al. | |
| 9,311,381 B2 | 4/2016 | Milousheff et al. | |
| 9,781,207 B2 | 10/2017 | Shirley, Jr. et al. | |
| 9,900,275 B2 | 2/2018 | Nielsen et al. | |
| 9,984,090 B1* | 5/2018 | Shang | G06F 16/13 |
| 10,025,568 B2 | 7/2018 | Mayer et al. | |
| 10,176,237 B2 | 1/2019 | Nadgir et al. | |
| 2012/0159511 A1 | 6/2012 | Buesing et al. | |
| 2013/0232152 A1 | 9/2013 | Dhuse et al. | |
| 2013/0304745 A1 | 11/2013 | Dhuse et al. | |
| 2014/0074899 A1 | 3/2014 | Halevy et al. | |
| 2014/0173080 A1 | 6/2014 | Dilmaghani et al. | |
| 2015/0120706 A1* | 4/2015 | Hoffman | G06F 16/951 707/722 |
| 2015/0234845 A1 | 8/2015 | Moore et al. | |

(Continued)

OTHER PUBLICATIONS

Final Office Action dated Jan. 13, 2022 in related U.S. Appl. No. 16/741,924, 21 pages.
(Continued)

*Primary Examiner* — Tony Mahmoudi
*Assistant Examiner* — Kamal K Dewan
(74) *Attorney, Agent, or Firm* — Robert Richard Aragona; Andrew D. Wright; Calderon Safran & Cole P.C.

(57) ABSTRACT

A method includes: obtaining, by a computing device, a first work item from a first index, wherein the first work item represents a namespace of a bucket of a vault in a dispersed storage network; dividing, by the computing device, the namespace into plural ranges of names; creating, by the computing device, plural second work items, each respective one of the plural second work items including a respective one of the plural ranges of names; and adding, by the computing device, each of the plural second work items to a second index.

15 Claims, 8 Drawing Sheets

(56) References Cited

U.S. PATENT DOCUMENTS

| | | | |
|---|---|---|---|
| 2015/0347187 A1 | 12/2015 | Panda et al. | |
| 2016/0088034 A1 | 3/2016 | Martens et al. | |
| 2017/0083434 A1* | 3/2017 | Potash | G06F 9/00 |
| 2017/0091035 A1 | 3/2017 | Kazi et al. | |
| 2017/0123848 A1 | 5/2017 | Borich et al. | |
| 2017/0123976 A1 | 5/2017 | Motwani | |
| 2017/0193023 A1* | 7/2017 | Dhuse | G06F 16/2246 |
| 2017/0255589 A1 | 9/2017 | Barber et al. | |
| 2017/0286465 A1* | 10/2017 | Venkatesh | G06F 16/13 |
| 2017/0337154 A1* | 11/2017 | Barber | G06F 9/5016 |
| 2018/0074903 A1* | 3/2018 | Leggette | G06F 3/0659 |
| 2018/0205552 A1* | 7/2018 | Struttmann | H04L 9/0637 |
| 2018/0253443 A1 | 9/2018 | Marwah et al. | |
| 2018/0307719 A1* | 10/2018 | Mandagere | G06F 16/2365 |
| 2018/0314706 A1 | 11/2018 | Sirton et al. | |
| 2018/0314718 A1 | 11/2018 | Fernandez et al. | |
| 2018/0356989 A1 | 12/2018 | Meister et al. | |
| 2019/0163572 A1 | 5/2019 | Dhuse et al. | |
| 2019/0179805 A1* | 6/2019 | Prahlad | G06Q 50/188 |
| 2020/0097218 A1* | 3/2020 | Kaushik | G06F 3/061 |
| 2020/0174671 A1 | 6/2020 | Margaglia et al. | |
| 2020/0311559 A1* | 10/2020 | Chattopadhyay | G06N 5/01 |
| 2020/0394455 A1* | 12/2020 | Lee | G06Q 40/08 |

OTHER PUBLICATIONS

Meier et al., "Abstracting Event-Driven Systems With Lifestate Rules", Cornell University Library, Dec. 31, 2016, 15 pages.

Simonet et al., "Active Data: A Programming Model to Manage Data Life Cycle Across Heterogeneous Systems and Infrastructures", HAL archived-ouvertes, Future Generation Computer Systems, Apr. 22, 2015, 50 pages.

El Arass et al., "Data Lifecycle: From Big Data to Smart Data", CIST IEEE 5th International Congress on, Oct. 21-27, 2018, 9 pages.

Steinau et al., "A Modeling Tool for PHILharmonicFlows Objects and Lifecycle Processes", Institute of Databases and Information Systems, Ulm University, Germany, BPMD'17 DBIS EPub BPM Demo Session, Sep. 12-14, 2017, 5 pages.

Mell et al., "The NIST Definition of Cloud Computing", NIST, Special Publication 800-145, Sep. 2011, 7 pages.

Anonymous, "B+ tree", Wikipedia, https://en.wikipedia.org/wiki/B%2B_tree, accessed Nov. 4, 2019, 6 pages.

Leonard, "IBM Cloud Object Storage Concepts and Architecture System Edition", Redbooks, 2019, 34 pages.

Anonymous, "B-tree", Wikipedia, https://en.wikipedia.org/wiki/B-tree, accessed Nov. 4, 2019, 13 pages.

List of IBM Patents or Patent Applications Treated as Related, Jan. 14, 2020, 1 page.

Office Action dated Jun. 10, 2021 in related U.S. Appl. No. 16/741,924, 17 pages.

Office Action dated Jun. 24, 2022 in related U.S. Appl. No. 16/741,924, 24 pages.

Office Action dated Feb. 9, 2023, in related U.S. Appl. No. 16/741,924, 29 pages.

Notice of Allowance dated Jun. 20, 2023, in U.S. Appl. No. 16/741,924, 8 Pages.

* cited by examiner

NAMESPACE RANGE CREATION TO DISTRIBUTE WORKLOAD IN A DISPERSED STORAGE SYSTEM

BACKGROUND

Aspects of the present invention relate generally to processing work items in dispersed storage systems and, more particularly, to systems and methods for performing namespace range creation to distribute workload in a dispersed storage system.

Computing devices communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

A computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop® is an open source software framework that supports distributed applications enabling application execution by thousands of computers.

In addition to cloud computing, a computer may use "cloud storage" as part of its memory system. Cloud storage enables a user, via its computer, to store files, applications, etc., on an Internet storage system. The Internet storage system may include a RAID (redundant array of independent disks) system and/or a dispersed storage system that uses an error correction scheme to encode data for storage.

SUMMARY

In a first aspect of the invention, there is a computer-implemented method including: obtaining, by a computing device, a first work item from a first index, wherein the first work item represents a namespace of a bucket of a vault in a dispersed storage network; dividing, by the computing device, the namespace into plural ranges of names; creating, by the computing device, plural second work items, each respective one of the plural second work items including a respective one of the plural ranges of names; and adding, by the computing device, each of the plural second work items to a second index.

In another aspect of the invention, there is a computer program product, the computer program product comprising one or more computer readable storage media having program instructions collectively stored on the one or more computer readable storage media, the program instructions executable to: obtain a first work item from a first leasable index, wherein the first work item represents a namespace of a bucket of a vault in a dispersed storage network; divide the namespace into plural ranges of names; create plural second work items, each respective one of the plural second work items including a respective one of the plural ranges of names; and add each of the plural second work items to a second leasable index.

In another aspect of the invention, there is system including a processor, a computer readable memory, and a computer readable storage medium. The system includes: program instructions to lease a first work item from a first leasable index, wherein the first work item represents a namespace of a bucket in a dispersed storage network; program instructions to divide the namespace into plural ranges of names; program instructions to create plural second work items, each respective one of the plural second work items including a respective one of the plural ranges of names; and program instructions to add each of the plural second work items to a second leasable index. The program instructions are stored on the computer readable storage medium for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
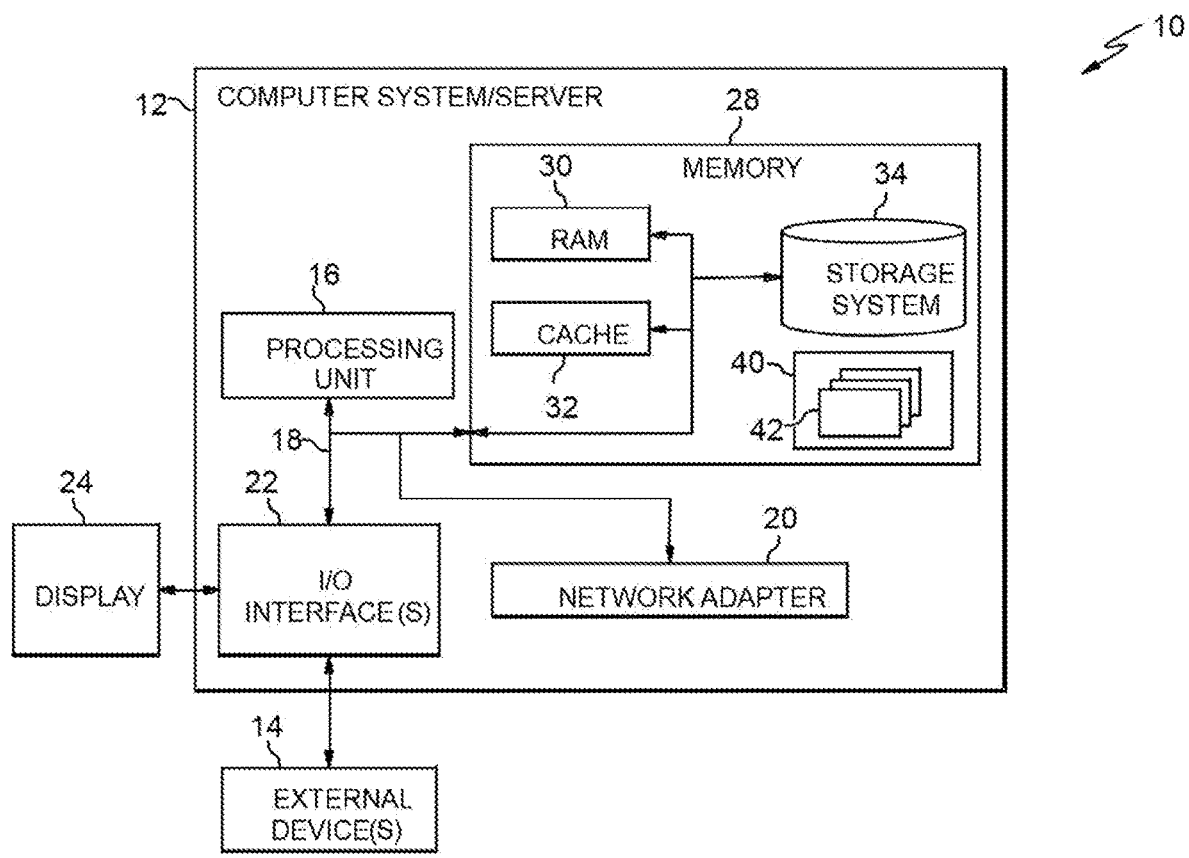
FIG. 1 depicts a cloud computing node according to an embodiment of the present invention.

Aspects of the present invention relate generally to processing work items in dispersed storage systems and, more particularly, to systems and methods for performing namespace range creation to distribute workload in a dispersed storage system. Aspects of the invention are usable in background processes, such as object lifecycle management processes, in a dispersed storage network (DSN).

A user may wish to have a DSN manage the lifecycle of their data for them. For example the user may want to configure the DSN to remove data that has reached a certain age, or to remove data after a certain date. As another example, rather than remove data, the user may wish to move the data to a lower cost, or lower performance, storage media. According to aspects of the invention, a DSN may be organized into multiple buckets, each of which may have different object lifecycle management rules. In embodiments, a user may define one or more object lifecycle management rules for a bucket containing the user's data objects.

In accordance with aspects of the invention, a DSN has a generalized mechanism referred to as the Producer Consumer Scheduler Framework (PCSF) that is configured to perform background work in dispersed storage systems. This system can be utilized to create a series of producer/consumer/scheduler bundles that can implement support for object lifecycle management in the background of a DSN, e.g., according to the user-defined object lifecycle management rules that are associated with buckets in the DSN.

However, the objects names in any given namespace (e.g., for a particular bucket) are often unequally distributed. For example, there might be five data objects that begin with the letter "A" and ninety data objects that begin with the letter "B". The work distribution for background tasks working on these objects is difficult, as if the namespace is divided into equal chunks, each work item can have unequal number of objects to work on. For example, if a first DSN node processes all the objects beginning with the letter "A" and a second DSN node processes all the objects beginning with the letter "B" then there is an uneven distribution of work between the first DSN node and the second DSN node, and this leads to inefficiency in processing tasks performed in the DSN. Also, in such a situation, there can be duplication of work between DSN nodes, resulting in further inefficiency of the DSN as a whole.

Aspects of the invention address this issue by dividing an internal namespace tree structure (e.g., from an index) into approximately equal sized pieces, where each piece has a fixed number of leaf nodes, and adding these pieces to a Distributed Leasable Tree structure (e.g., another index). In this manner, work items that are based on the approximately equal sized pieces all contain approximately the same number of data objects, such that the work performed in scanning these work items is more evenly distributed amongst the DSN nodes that perform the work processes. As such, in an embodiment there is a method for equal work distribution in a dispersed storage network (DSN) comprising the steps of: dividing an internal namespace for the DSN into a plurality of pieces, wherein each piece has a fixed number of leaf nodes; and adding the plurality of equal pieces to a distributed leasable tree structure, wherein each of the plurality of equal pieces can be leased by one or more DS processing units.

Aspects of the invention improve the functioning of a computer system by increasing the efficiency of the system and avoiding duplication of tasks. In particular, aspects of the invention improve the efficiency of a DSN by evenly distributing workload amongst plural different DSN nodes that perform background tasks in the DSN. Aspects of the invention also generate new data that does not previously exist (e.g., work items containing approximately equal numbers of object names), and use this new data in subsequent steps (e.g., adding the work items to a leasable index from which the work items are leased by DSN nodes to perform object lifecycle management tasks using the work items).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
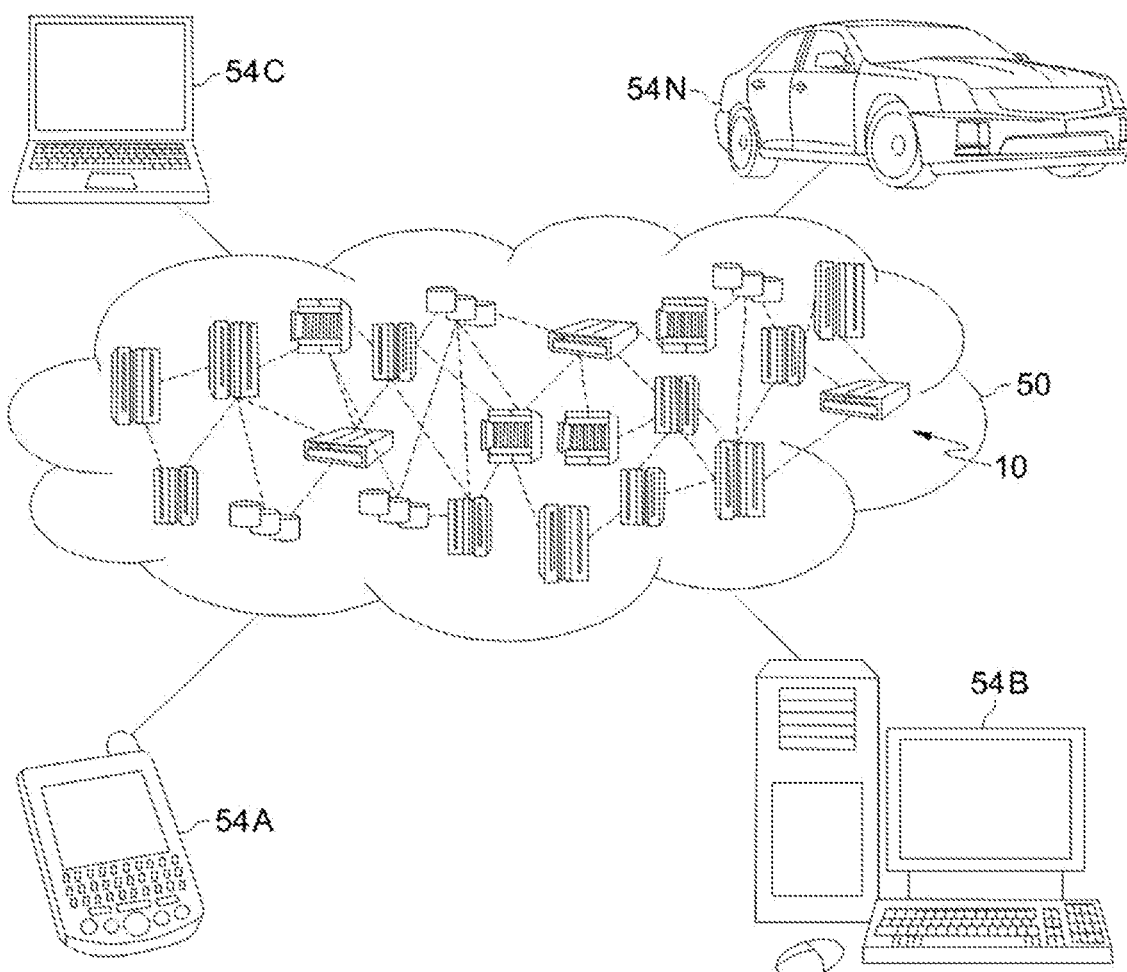
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
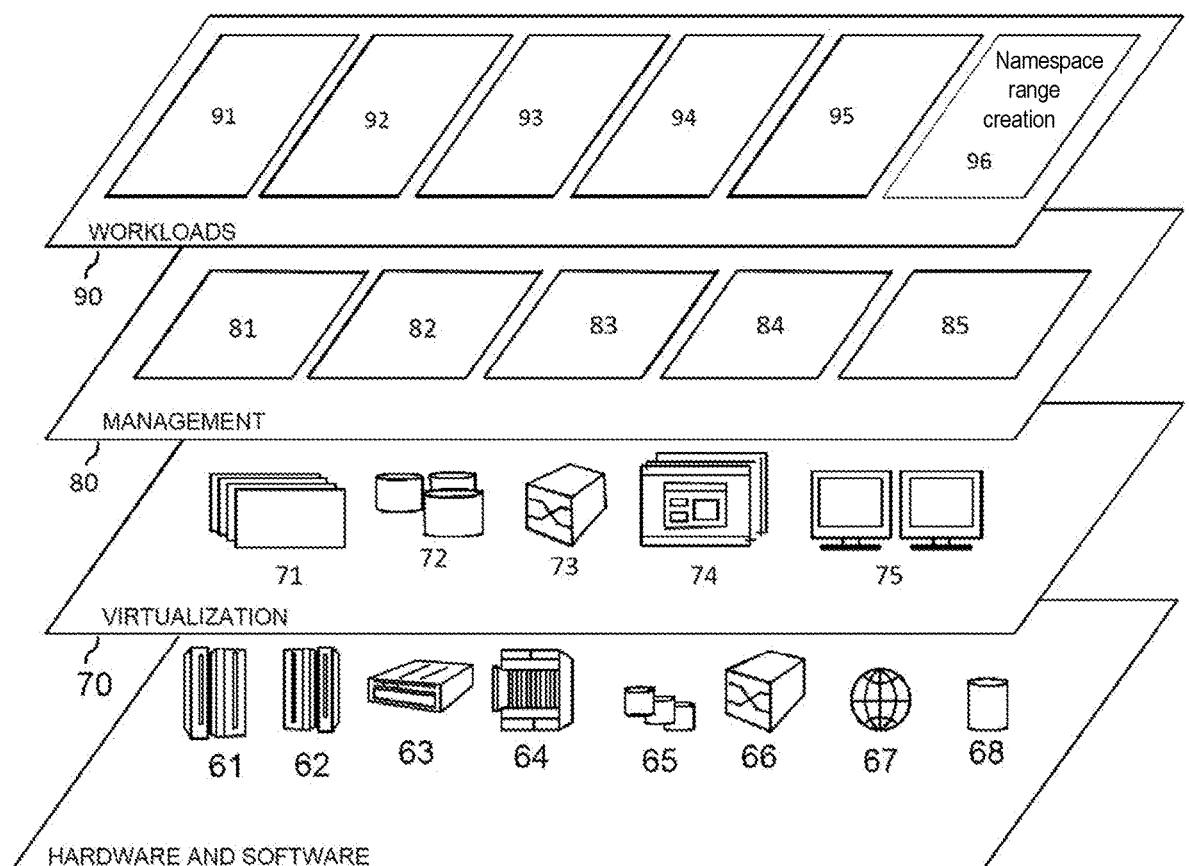
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and namespace range creation 96.

Implementations of the invention may include a computer system/server 12 of FIG. 1 in which one or more of the program modules 42 are configured to perform (or cause the computer system/server 12 to perform) one or more functions of the namespace range creation 96 of FIG. 3. For example, the one or more of the program modules 42 may be configured to: obtain a first work item from a first index, wherein the first work item represents a namespace of a bucket of a vault in a dispersed storage network; divide the namespace into plural ranges of names; create plural second work items, each respective one of the plural second work items including a respective one of the plural ranges of names; and add each of the plural second work items to a second index.

Figure 4:
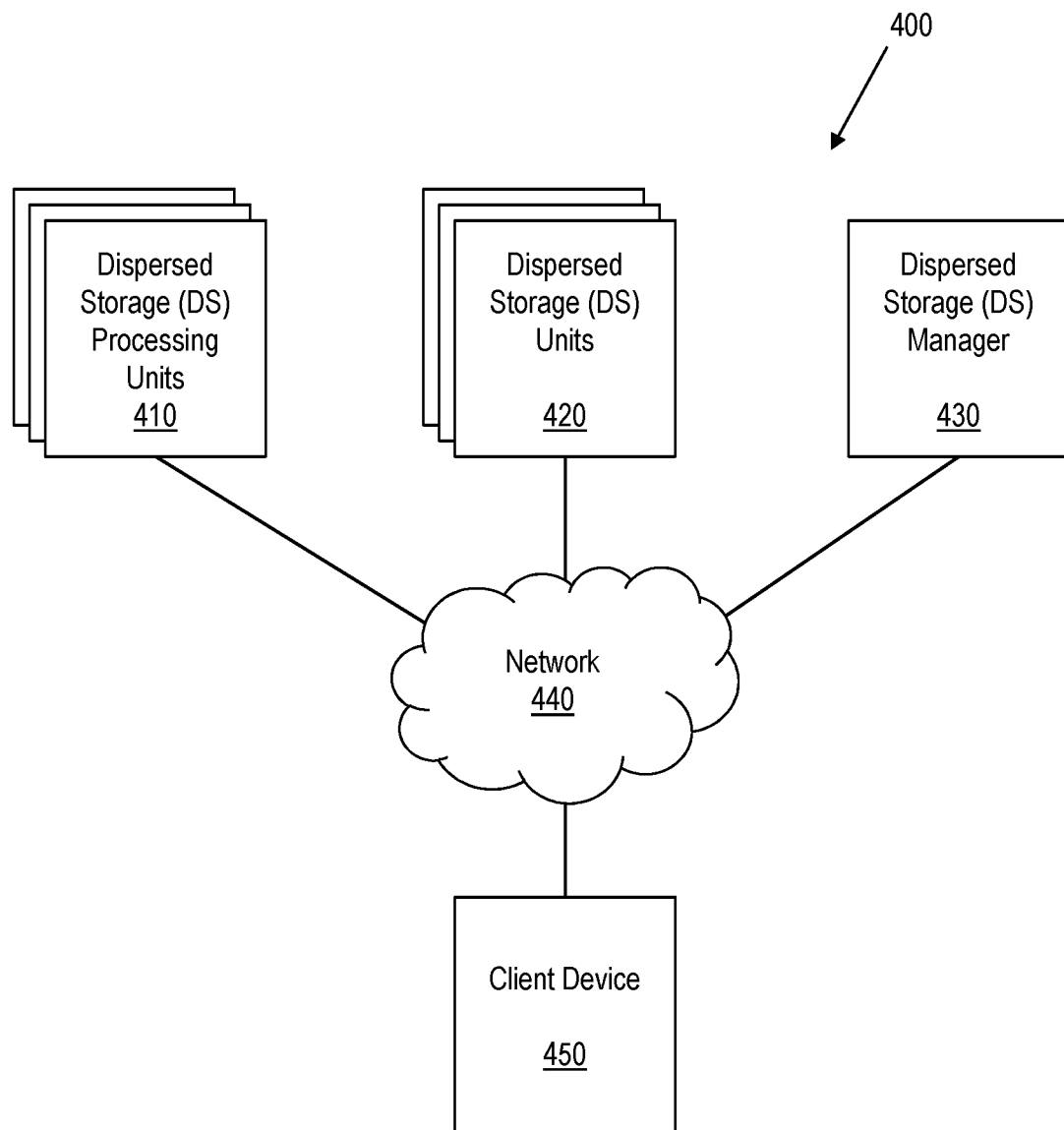
FIG. 4 shows a dispersed storage network (DSN) in accordance with aspects of the invention.

FIG. 4 shows a dispersed storage network 400 (DSN) in accordance with aspects of the invention. In embodiments, the DSN 400 comprises plural dispersed storage processing units 410 (DS processing units), plural dispersed storage units 420 (DS units), and at least one dispersed storage manager 430 (DS manager). The DS processing units 410, the DS units 420, and the DS manager 430 all communicate via a network 440, which comprises one or more computer networks such as a LAN, WAN, and the Internet. In a cloud implementation, the network 440 is a cloud computing environment 50 of FIG. 2, and the DS processing units 410, the DS units 420, and the DS manager 430 are each nodes 10 in the cloud computing environment 50.

In accordance with aspects of the invention, the DSN 400 stores data using object storage technology, which uses Information Dispersal Algorithms (IDAs) to separate a data object into slices that are distributed to plural ones of the DS units 420. As used herein, a slice is a dispersed piece of encoded data. Slices are created from an original data object and can be used to recreate the original data object. In particular, the DSN 400 creates slices using a combination of erasure coding, encryption, and dispersal algorithms. The erasure coding generates 'extra' slices for each data object, such that the data object can be recreated from a subset (less than all of) the total number of slices that are stored for this data object. By dividing a data object into slices and storing the slices at plural different DS units 420, the DSN 400 ensures that no single one of the DS units 420 has all the slices that are necessary to recreate the data object. Moreover, by creating extra slices for each data object, the DSN 400 can tolerate multiple failures without losing the ability to recreate the original data object, e.g., from the available slices.

According to aspects of the invention, the DS manager 430 provides a management interface that is used for system administrative tasks, such as system configuration, storage provisioning, and monitoring the health and performance of the system. The DS manager 430 may comprise a physical device (e.g., a computer device such as computer system/server 12 of FIG. 1), a virtual machine (VM), or a container (e.g., a Docker container). The terms "Docker" and "Hadoop" may be subject to trademark rights in various jurisdictions throughout the world and are used here only in reference to the products or services properly denominated by the marks to the extent that such trademark rights may exist.

According to aspects of the invention, the DS processing units 410 are configured to encrypt and encode data during a write operation, to manage the dispersal of slices of data during a write operation, and to decode and decrypt data during a read operation. In embodiments, the DS processing units 410 are stateless components that present a storage interface to a client application and that transform data objects into slices using an IDA. Each DS processing unit 410 may comprise a physical device (e.g., a computer device such as a computer system/server 12 of FIG. 1), a virtual machine (VM), or a container (e.g., a Docker container).

According to aspects of the invention, the DS units 420 are configured to store the data slices that are received from a DS processing unit 410 during a write, and to return data slices to a DS processing unit 410 during a read. Each DS unit 420 comprises a physical device, e.g., a computer storage device such as the storage system 34 of FIG. 1.

In implementations, a client device 450 runs a client application that communicates with one of the DS processing units 410 to perform data operations in the DSN 400. In embodiments, the client application uses application programming interfaces (APIs) to perform data operations in the DSN 400. In one example, a first API call (e.g., PUT)

writes a data object to the DSN 400, a second API call (e.g., GET) reads a data object from the DSN 400, a third API call (e.g., DELETE) deletes a data object from the DSN 400, and a fourth API call (e.g., LIST) lists all the data objects in a bucket in the DSN 400. In embodiments, the client device 450 comprises a computer device such as a laptop computer, desktop computer, tablet computer, etc., and may comprise one or more components of the computer system/server 12 of FIG. 1. In embodiments, the client application running on the client device 450 is a software application, and may comprise one or more program modules 42 as described with respect to FIG. 1. In embodiments, the client device 450 communicates with one of the DS processing units 410 via the network 440.

In embodiments, a vault is a group of DS processing units 410 and DS units 420 in the DSN 400. A vault can be spread across plural DS units 420, and the DSN 400 may include plural different vaults. For example, the DSN 400 may include a first vault at a first geographic location (e.g., Texas), and a second vault at a second geographic location (e.g., Germany). In embodiments, a bucket is a logical storage unit of a vault. As used herein, a bucket is a group of objects stored in a vault that share a same namespace within the vault, where the namespace is an address structure used to identify objects in the system. A vault can have plural different buckets (and, therefore, plural different namespaces). Each bucket stores one or more objects, e.g., as plural slices in various ones of the DS units 420 in the vault.

According to aspects of the invention, each bucket may have one or more object lifecycle management (OLM) rules that define certain actions to perform on objects in the bucket when certain conditions are satisfied. In embodiments, the DSN 400 has an OLM front-end comprising an API that the client application running on the client device 450 calls to define OLM rules for a bucket. As used herein, a rule that is associated with a bucket (also referred to as a bucket rule or simply a rule) is a data structure that defines a prescribed action for the DSN 400 to perform on an object in the bucket when metadata associated with the object satisfies a condition defined in the rule. Conditions defined in a rule may include but are not limited to one or more of: matching prefixes; matching suffixes; the object being older than a predefined age; a calendar date having been reached; the object was created during a specific date range; and the amount of space utilized has reached or exceeded a threshold amount. Actions defined in a rule may include but are not limited to one or more of: deleting an object from the DSN 400; moving an object to a different storage medium within the DSN 400; and moving an object to a different storage system outside the DSN 400. For example, a rule associated with a particular bucket might specify that any object (in the bucket) that is older than 6 months is deleted. As another example, a rule may specify that all data objects (in the bucket) that begin with the prefix "/merger" is moved to a different tier of storage after a date defined by the rule. These examples are not limiting, and different rules may be used.

In embodiments, the DSN 400 includes an OLM back-end comprising plural Producer Consumer Scheduler Framework (PCSF) bundles that are configured to perform a four stage process comprising: (i) identify all the buckets within a vault that have a rule, and generate a first leasable index including work items corresponding to these buckets; (ii) for each work item in the first leasable index, divide the namespace of the bucket into ranges of object names of approximately equal size, and add these ranges as work items to a second leasable index; (iii) for each work item in the second leasable index, analyze the object metadata of each object in the range to identify objects that satisfy the rule associated with this bucket, and add the identified objects as work items to a third leasable index; and (iv) for each work item in the third leasable index, perform the action specified by the rule associated with this bucket on the object of this work item.

Figure 5:
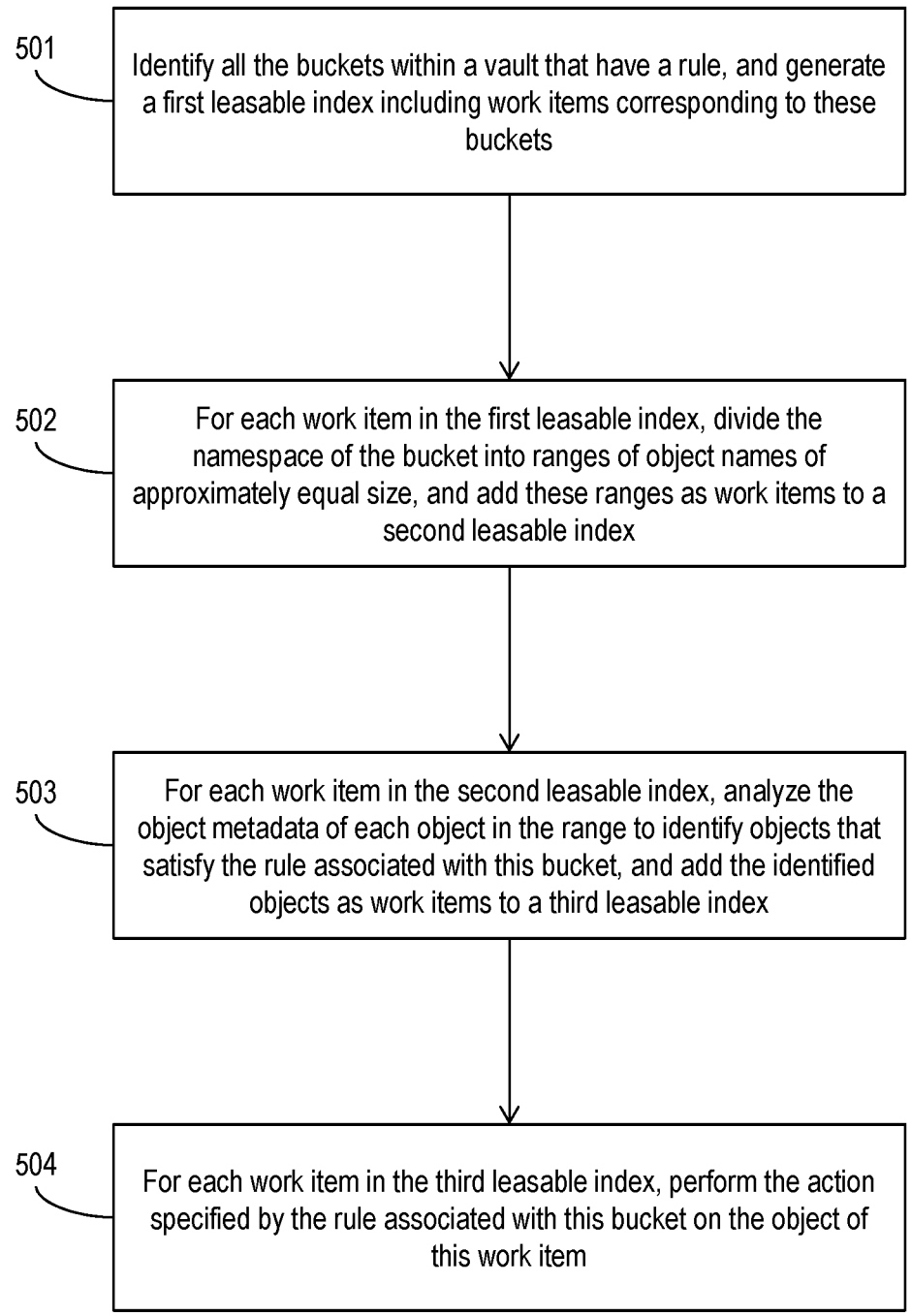
FIG. 5 shows a flowchart of an exemplary method in accordance with aspects of the invention.

This four stage process is illustrated in a flowchart in FIG. 5 with the steps numbered as 501-504. In embodiments, various ones of the DS processing units 410 run PCSF bundles that perform steps 501-504. In a particular embodiment, a single one of the DS processing units 410 in the DSN 400 performs step 501 to generate a respective first leasable index for each respective vault in the DSN 400. Then, in response to receiving the respective first leasable index for a respective vault, any of plural ones of the DS processing units 410 in that respective vault perform steps 502, 503, and 504 on identified ones of the buckets in that vault. In embodiments, step 501 is performed for each vault on a predefined interval, such as once per day. However, implementations are not limited to this interval, and other intervals may be used.

As used herein, a leasable index is a data structure that contains a queue of work items, where plural DS processing units 410 act in parallel to lease individual ones of the work items and process the leased work items. In embodiments, when a first DS processing unit 410 leases a work item from a leasable index, that work item is marked as "leased" in the leasable index, which prevents a second one of the DS processing units 410 from leasing and working on this same work item at the same time as the first DS processing unit 410. If the first DS processing unit 410 completes the processing of this work item within a predefined amount of time, then this work item is deleted from the leasable index. On the other hand, if the first DS processing unit 410 does not complete the processing on this work item within the predefined amount of time, then the lease for this work item expires in the leasable index, which means that another DS processing unit 410 can now lease this work item from the leasable index. In this manner, plural DS processing units 410 work in parallel to lease and process respective ones of the work items from the leasable index. In implementations, the contents of the queue of a leasable index may be in a near constant state of flux, as new work items are added and existing work items are leased and deleted. In a particular embodiment, a leasable index is a Dispersed Lockless Concurrent Index (DLCI).

Figure 6:
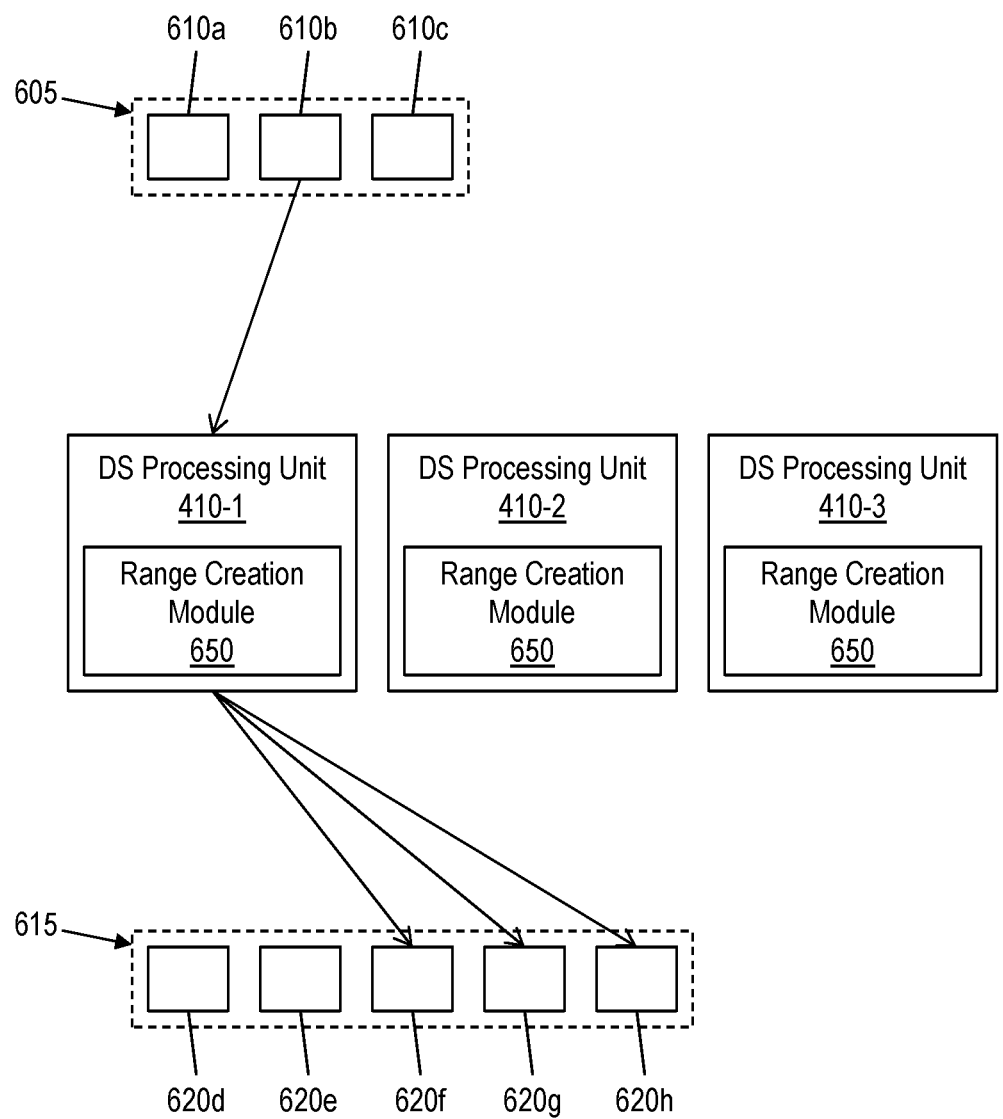
FIG. 6 shows a block diagram that illustrates operation of one of the steps in accordance with aspects of the invention.

FIG. 6 shows a block diagram that illustrates operation of step 502 of FIG. 5 in accordance with aspects of the invention. In embodiments, during execution of the OLM background processes described herein, a first leasable index 605 includes work items 610*a*, 610*b*, 610*c*. Each of these work items 610*a*, 610*b*, 610*c* represents a namespace of a bucket in this particular vault and having an OLM rule, e.g., as identified at step 501. According to aspects of the invention, any one of the DS processing units 410-1, 410-2, 410-3 in this vault can lease one of the work items 610*a*, 610*b*, 610*c* from the first leasable index 605, and process that work item to generate one or more work items that are added to a second leasable index 615. In the example shown in FIG. 6, the DS processing unit 410-1 leases the work item 610*b* from the first leasable index 605 and, using the leased work item 610*b*, the DS processing unit 410-1 generates work items 620*f,* 620*g,* 620*h* that are added to the queue of the second leasable index 615 (i.e., the second leasable index 615 already including work items 620*d*, 620*e*). Although not shown in FIG. 6, work item 610*b* is then deleted from the first leasable index 605.

In accordance with aspects of the invention, each of the work items 620*f*, 620*g*, 620*h* includes a respective range of names of objects in the namespace of the bucket associated with work item 610*b*. In embodiments, the system creates the work items 620*f*, 620*g*, 620*h* using an algorithm that causes each of the work items 620*f*, 620*g*, 620*h* to have approximately the same number of names of objects in its respective range. In this manner, embodiments of the invention cause the processing that subsequently occurs at step 503 to be evenly distributed amongst the DS processing units 410-1, 410-2, 410-3 by virtue of the fact that each work item (e.g., 620*f*, 620*g*, 620*h*) that is processed by any one of the DS processing units 410-1, 410-2, 410-3 at step 503 has approximately a same number of objects to scan.

In embodiments, each of the DS processing units 410-1, 410-2, 410-3 comprises a range creation module 650 that is configured to perform step 502 as described herein. The range creation module 650 may be one or more program modules 42 as described with respect to FIG. 1. In a particular embodiment, the range creation module 650 comprises a PCSF bundle that includes a range creation consumer, a range creation scheduler, and a range creation consumer, each of which may comprise one or more program modules 42 as described herein.

In an exemplary implementation, the range creation module 650 determines the respective ranges of names of objects within each of the respective work items 620*f*, 620*g*, 620*h* using a namespace tree structure (of the namespace of the work item from the first leasable index) and an algorithm that includes parameters that are used to define the namespace tree structure. In embodiments, the namespace tree structure is a "B+ tree" data structure that is used internally by the DSN 400 (e.g., internally meaning it is not visible to the user at client device 450) to keep a record of objects in this namespace in order to perform listings (e.g., LIST) and lookups in an efficient manner.

Figure 7:
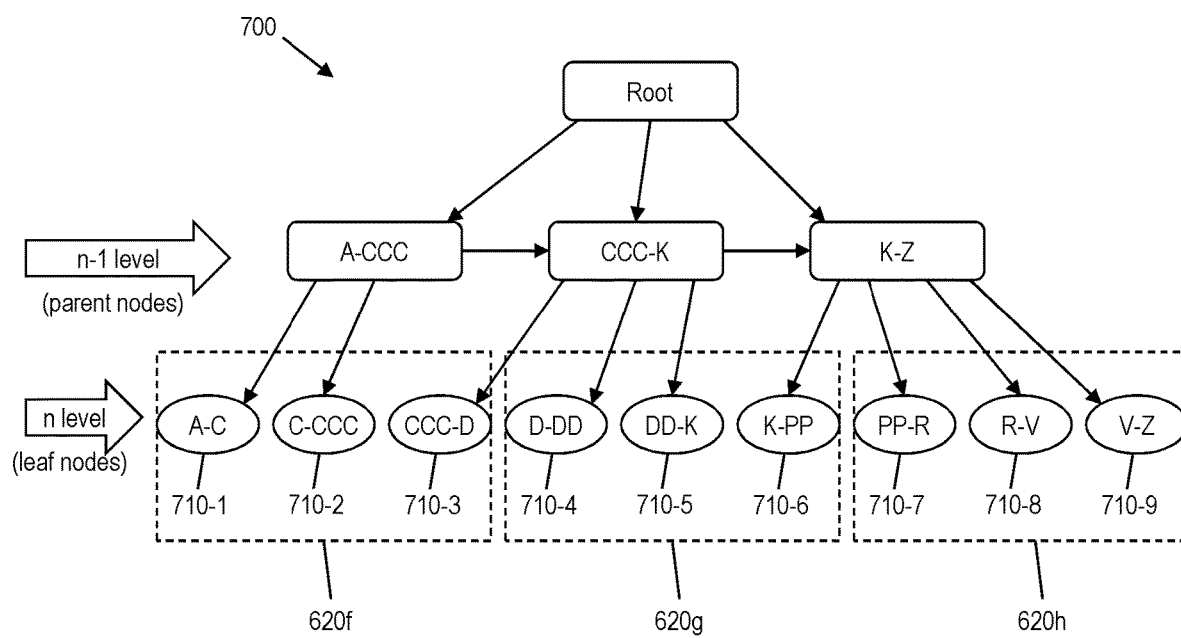
FIG. 7 shows an exemplary namespace tree structure and determining ranges in accordance with aspects of the invention.

An exemplary namespace tree structure 700 is shown in FIG. 7. In embodiments, the namespace tree structure 700 includes a number of levels equal to "n" with parent nodes at the "n−1" level and leaf nodes at the "n" level. In embodiments, "split-size" and "join-size" are parameters that are used to define the nodes in the namespace tree structure 700, with split-size being defined as the maximum number of objects in a leaf node, and join-size being the minimum number of objects in a leaf node. In embodiments, "k" is a configurable parameter that defines a number of leaf nodes to include in each work item (e.g., work items 620*f*, 620*g*, 620*h*). According to aspects of the invention, the range creation module 650 determines a number of objects to include in each range according to Equation 1.

$$\text{Number of objects} = ((\text{split-size} + \text{join-size})/2) * k \quad \text{(Equation 1)}$$

In embodiments, after determining the number of objects to include in each work item (e.g., work items 620*f*, 620*g*, 620*h*) according to Equation 1, the range creation module 650 determines the range of names of objects to include in each work item by traversing the namespace tree structure 700 in BFS (breadth-first search) order, and segregating the children nodes of all parent nodes into the respective work pieces, with "k" number of leaf nodes per work piece.

In the example shown in FIG. 7, split-size is set at 500, join-size is set at 185, and k is set at 3. In this example, the average number of objects in each leaf node is approximately 343 (e.g., (185+500)/2), and Equation 1 approximates the number of objects in each work item as 1029. In this example, the system determines the leaf nodes as follows: leaf node 710-1 contains objects having names beginning with A through C; leaf node 710-2 contains objects having names beginning with C through CCC; leaf node 710-3 contains objects having names beginning with CCC through D; leaf node 710-4 contains objects having names beginning with D through DD; leaf node 710-5 contains objects having names beginning with DD through K; leaf node 710-6 contains objects having names beginning with K through PP; leaf node 710-7 contains objects having names beginning with PP through R; leaf node 710-8 contains objects having names beginning with R through V; and leaf node 710-9 contains objects having names beginning with V through Z. In this example, the range creation module 650 groups leaf nodes 710-1, 710-2, 710-3 into first work item 620*f*, leaf nodes 710-4, 710-5, 710-6 into second work item 620*g*, and leaf nodes 710-7, 710-8, 710-9 into third work item 620*h*. In this example, the first work item 620*f* contains a range of object names that begin with A through D, the second work item 620*g* contains a range of object names that begin with D through PP, and the third work item 620*h* contains a range of object names that begin with PP through Z.

Figure 8:
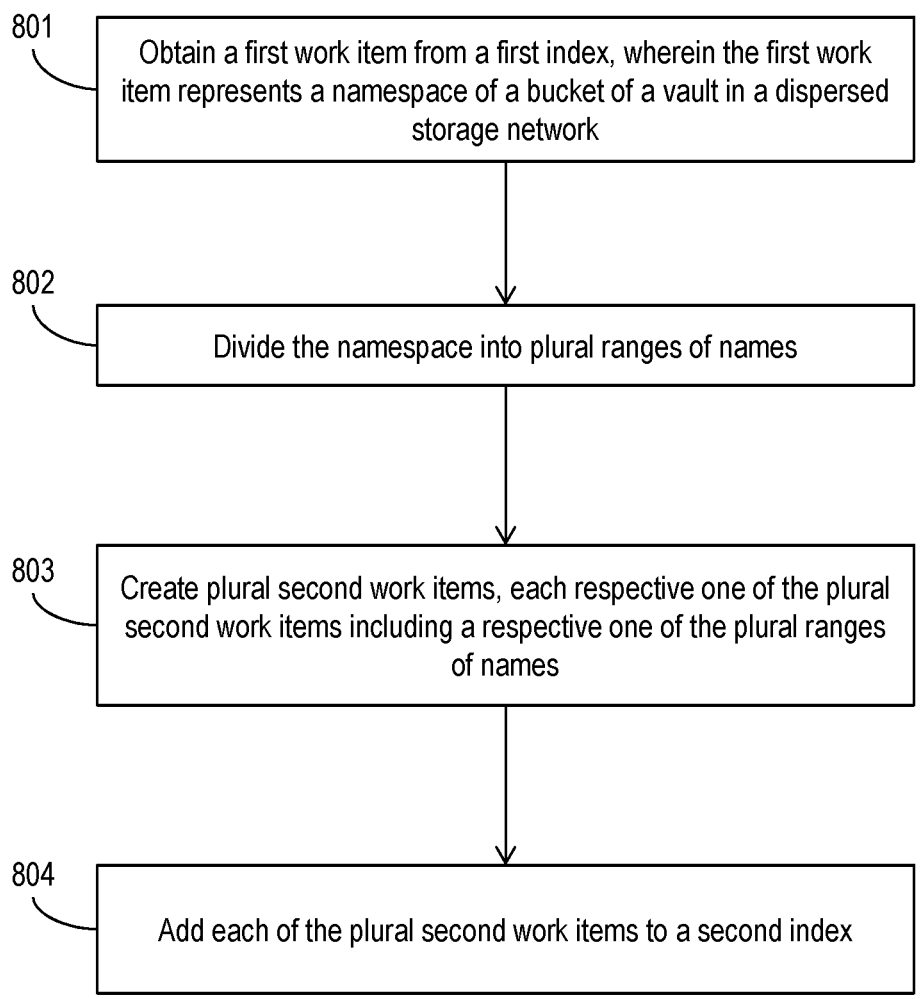
FIG. 8 shows a flowchart of an exemplary method in accordance with aspects of the invention.

FIG. 8 shows a flowchart of an exemplary method in accordance with aspects of the present invention. Steps of the method may be carried out in the environment of FIG. 4 and are described with reference to elements depicted in FIG. 4.

At step 801, a DS processing unit 410 obtains a first work item from a first index. In embodiments, and as described herein, the first index is the first leasable index 605, in which each work item corresponds to a namespace of a bucket of a vault in a dispersed storage network. The namespace contains names of objects stored in this particular bucket. In embodiments, this bucket is included in the first index based on a determination that the bucket has an object lifecycle management rule, e.g., as described at step 501.

At step 802, the DS processing unit 410 divides the namespace into plural ranges of names. In embodiments, and as described herein, the ranges of names are ranges of names of objects in the bucket. In embodiments, and as described herein, the dividing is performed using a namespace tree structure and an equation, such as Equation 1, that approximates a same number of names in each of the plural ranges of names.

At step 803, the DS processing unit 410 creates plural second work items, each respective one of the plural second work items including a respective one of the plural ranges of names. At step 804, the DS processing unit 410 adds each of the plural second work items to a second index. In embodiments, and as described herein, respective ones of the plural second work items are subsequently leased from the second index by one of the plural dispersed storage processing units, for further processing according to the OLM rule associated with this bucket.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   obtaining, by a computing device, a first work item from a first index, wherein the first work item represents a namespace of a bucket of a vault in a dispersed storage network;
   dividing, by the computing device, the namespace into plural ranges of names;
   creating, by the computing device, plural second work items, each respective one of the plural second work items including a respective one of the plural ranges of names; and
   adding, by the computing device, each of the plural second work items to a second index,
   wherein the computing device is one of plural dispersed storage processing units in the vault in the dispersed storage network,
   the names are names of data objects stored in the dispersed storage network,
   for each respective one of the data objects, one of the plural dispersed storage processing units stores the respective one of the data objects in the dispersed storage network by separating the respective one of the data objects into slices that are stored in plural different dispersed storage units in the dispersed storage network, and
   the dividing is performed using a namespace tree structure and an equation that approximates a same number of names in each of the plural ranges of names, wherein the equation is:

number of objects=((split-size+join-size)/2)*$k$ where:
   split-size is a maximum number of objects in a leaf node of the namespace tree structure of the namespace;
   join-size is a minimum number of objects in a leaf node of the namespace tree structure of the namespace; and
   $k$ is a number of leaf nodes included in each of the plural second work items.

2. The method of claim 1, wherein the first work item is included in the first index based on a determination that the bucket has an object lifecycle management rule.

3. The method of claim 2, wherein the object lifecycle management rule defines an action to perform on an object that is in the bucket and that is determined to satisfy one or more conditions, the action comprising one selected from the group consisting of:
   deleting the object;
   moving the object to a different portion of the dispersed storage network; and
   moving the object to a different storage outside the dispersed storage network.

4. The method of claim 1, wherein the second index is a different index than the first index.

5. The method of claim 1, wherein:
   the first index comprises a first leasable index; and
   the second index comprises a second leasable index.

6. The method of claim 1, wherein respective one of the plural second work items are subsequently leased from the second index by one of the plural dispersed storage processing units.

7. A computer program product comprising one or more computer readable storage media having program instructions collectively stored on the one or more computer readable storage media, the program instructions executable to cause a computing device in a dispersed storage network to:
   obtain a first work item from a first leasable index, wherein the first work item represents a namespace of a bucket of a vault in the dispersed storage network;
   divide the namespace into plural ranges of names;
   create plural second work items, each respective one of the plural second work items including a respective one of the plural ranges of names; and
   add each of the plural second work items to a second leasable index,
   wherein the names are names of data objects stored as slices in plural different dispersed storage units in the dispersed storage network, and
   the dividing is performed using a namespace tree structure and an equation, wherein the equation is:

number of objects=((split-size+join-size)/2)*$k$ where:
   split-size is a maximum number of objects in a leaf node of the namespace tree structure of the namespace;
   join-size is a minimum number of objects in a leaf node of the namespace tree structure of the namespace; and
   $k$ is a number of leaf nodes included in each of the plural second work items.

8. The computer program product of claim 7, wherein the first work item is included in the first index based on a determination that the bucket has an object lifecycle management rule.

9. The computer program product of claim 7, wherein:
   the computing device is one of plural dispersed storage processing units in the vault in the dispersed storage network; and
   respective one of the plural second work items are subsequently leased from the second index by the one of the plural dispersed storage processing units or another one of the plural dispersed storage processing units.

10. A system comprising:
a computing device comprising a processor, a computer readable memory, and a computer readable storage medium; and
program instructions stored on the computer readable storage medium for execution by the processor via the computer readable memory, wherein the program instructions executable to cause the computing device to:
lease a first work item from a first leasable index, wherein the first work item represents a namespace of a bucket in a dispersed storage network;
divide the namespace into plural ranges of names;
create plural second work items, each respective one of the plural second work items including a respective one of the plural ranges of names; and
add each of the plural second work items to a second leasable index,
wherein the names are names of data objects stored as slices in plural different dispersed storage units in the dispersed storage network,
the dispersed storage network creates the slices, during a write operation, using a combination of erasure coding, encryption, and dispersal algorithms, and
the dividing is performed using an equation that approximates a same number of names in each of the plural ranges of names, wherein the equation is:

$$\text{number of objects} = ((\text{split-size} + \text{join-size})/2) * k$$

where:
split-size is a maximum number of objects in a leaf node of the namespace tree structure of the namespace;
join-size is a minimum number of objects in a leaf node of the namespace tree structure of the namespace; and
k is a number of leaf nodes included in each of the plural second work items.

11. The system of claim 10, wherein the first work item is included in the first index based on a determination that the bucket has an object lifecycle management rule.

12. The system of claim 10, wherein:
the computing device is one of plural dispersed storage processing units in the vault in the dispersed storage network; and
respective one of the plural second work items are subsequently leased from the second index by the one of the plural dispersed storage processing units or another one of the plural dispersed storage processing units.

13. The method of claim 1, wherein the namespace tree structure comprises a B+ tree.

14. The method of claim 5, wherein each of the first leasable index and the second leasable index comprises a data structure that contains a queue of work items, and different ones of the plural dispersed storage processing units act in parallel to lease individual items of the work items and process the leased work items.

15. The method of claim 1, wherein:
the first leasable index comprises a data structure that contains a queue of work items;
different ones of the plural dispersed storage processing units act in parallel to lease individual items of the work items from the first leasable index and process the leased work items; and
a work item is marked in the first leasable index in response to a first one of the plural dispersed storage processing units leasing the work item from the first leasable index, wherein the marking prevents a second one of the plural dispersed storage processing units from leasing and working on the work item at the same time as the first one of the plural dispersed storage processing units.

* * * * *